United States Patent [19]

Butula

[11] 3,920,678

[45] Nov. 18, 1975

[54] PROCESS FOR PRODUCING 4,5,6,7-TETRAHYDRO BENZIMIDAZOLES

[75] Inventor: Ivan Butula, Heidelberg-Pfaffengrund, Germany

[73] Assignee: Rhein-Chemie GmbH, Mannheim, Germany

[22] Filed: May 17, 1973

[21] Appl. No.: 361,106

Related U.S. Application Data

[63] Continuation of Ser. No. 807,399, March 14, 1969, abandoned.

[30] Foreign Application Priority Data

Mar. 15, 1968 United Kingdom............... 12750/68

[52] U.S. Cl.... 260/309; 260/247.2 R; 260/247.2 A; 260/247.2 B; 260/247.5 EP; 260/268 BC; 260/293.6; 260/296 B; 260/308 A; 260/308 D; 260/309.2; 260/690; 260/2 N; 260/77.5 AC; 252/8.8; 252/390; 252/401; 424/273

[51] Int. Cl.$^2$....................................... C07D 235/18

[58] Field of Search................. 260/309, 309.2, 690

[56] References Cited
UNITED STATES PATENTS 2,166,198  7/1939  Sexton ............................. 260/309.2

FOREIGN PATENTS OR APPLICATIONS 997,395  7/1965  United Kingdom.............. 260/309.2

OTHER PUBLICATIONS

Imidazole & Derivatives, Part I, pp. 254–255, (1953), Hofmann, Interscience Publishers, N.Y.

Kirk–Othmer Encyclopedia of Chemical Technology, 2d ed., (1968), Vol. 15: 832, 833, 835, 851, 854.

Ber. Vol. 71: 2124–2134, (1938), Weidenhagen et al.

Primary Examiner—Sherman D. Winters
Attorney, Agent, or Firm—Burgess, Dinklage & Sprung

[57] ABSTRACT

Benzimidazole and substituted benzimidazoles are hydrogenated rapidly and in good yield to the corresponding 4,5,6,7-tetrahydrobenzimidazole by hydrogenation over a palladium-containing catalyst. The products exhibit outstanding corrosion-inhibiting and antioxidant properties.

12 Claims, No Drawings

PROCESS FOR PRODUCING 4,5,6,7-TETRAHYDRO BENZIMIDAZOLES

This is a continuation of application Ser. No. 807,399 filed Mar. 14, 1969, now abandoned.

This invention relates to a novel process for the production of 4,5,6,7-tetrahydrobenzimidazole compounds which may be unsubstituted or substituted at the 1-position, 2-position, or at the available ring positions of the benzene moiety. In addition, this invention is directed to certain new 4,5,6,7-tetrahydrobenzimidazole compounds produced by said process and to novel acid addition and quaternary ammonium salts thereof. Further, the invention is concerned with new antioxidant and corrosion-inhibiting compositions containing such compounds or their salts.

The difficulty of catalytically hydrogenating benzimidazole and its derivatives is well-known; see Fries et al., *Liebigs Ann. der Chemie*, vol. 550, (1942), page 33. Thus, for example it is known that it is not possible to hydrogenate benzimidazole with nickel on diatomaceous earth activated with molybdenum as catalyst; see R. Weidenhagen et al., *Ber.*, vol. 71 (1938), page 2124. This was confirmed by N. Hartmann et al.; see *Helv. Chim. Acta*, vol. 21 (1938), page 1692. It was impossible to hydrogenate benzimidazole either with nickel under high pressure at 200°C. or with platinum at 200°C. in the presence of various solvents. Hartmann et al, however, were able to hydrogenate 2-substituted benzimidazoles, viz. 2-methyl-, 2-ethyl-, 1,2-dimethyl- and 2-phenyl-benzimidazole, with platinum in glacial acetic acid to the corresponding 4,5,6,7-tetrahydrobenzimidazoles. The hydrogenation of 1-substituted benzimidazoles as well as 2-substituted benzimidazoles which carry substitutente in the benzene nucleus of the benzimidazol was not possible by this method. R. Weidenhagen et al. supra, prepared by total synthesis 4,5,6,7-tetrahydrobenzimidazole as well as 2-substituted alkyl, phenyl, furyl, and anisyl-4,5,6,7-tetrahydrobenzimidazoles. Furthermore, R. Weidenhagen et al. prepared by total synthesis 5-methyl-4,5,6,7-tetrahydrobenzimidazole and its derivatives containing a methyl, ethyl, or n-propyl group in the 2-position. W. Ried et al, *Liebigs Ann. der Chemie*, vol. 616 (1958), page 87, attempted to hydrogenate bis-benzimidazolylalkanes with Raney nickel at a pressure of 110 to 120 kg/cm² and at 200° to 230°C. According to the elemental analysis, it was not conclusively decided whether 6 or 8 hydrogen atoms were taken up.

This invention is based on the surprising discovery that unsubstituted or substituted benzimidazole compounds can be hydrogenated with palladium catalysts smoothly, rapidly, and with good yields to form the corresponding 4,5,6,7-tetrahydrobenzimidazole compounds. This is especially surprising because it was previously generally recognized that palladium is very inferior to platinum as catalyst for nuclear hydrogenation reactions; see, e.g., F. Zymalkowski, *Katalytische Hydrierungen im Organisch-Chemischen Laboratorium* (Catalytic Hydrogenation in the Organic Chemistry Laboratory) published by Ferdinand Enke Verlag, Struttgart, Germany, in 1965; page 24.

In broad aspect, the process of this invention comprises contacting a benzimidazole compound with hydrogen in the presence of a palladium-containing catalyst. The benzimidazole compound may be reacted in the form of an acid addition salt thereof or, alternatively, in its form as a free base upon addition of at least one mole-equivalent of an acid per mole of base to the reaction. The reaction may be depicted graphically as follows (using benzimidazole as the starting material for purposes of illustration):

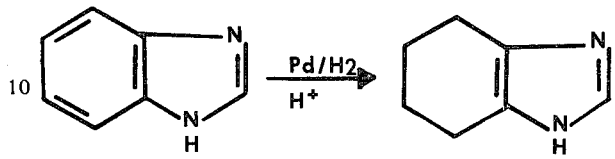

More specifically, the 4,5,6,7-tetrahydrobenzimidazole compounds which are prepared by the process of this invention can be illustrated by those responding to the following general formula:

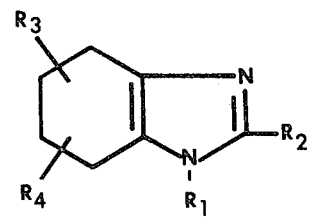

wherein $R_1$ can be hydrogen; a linear or branched-chain alkyl group containing from 1 to 18, and preferably from 1 to 4 carbon atoms; a 5 - or 6-membered cycloalkyl, alkylcycloalkyl or cycloalkylalkyl group containing not more than 18, and preferably not more than 10, carbon atoms; an arylalkyl group containing from 7 to 18 carbon atoms; or a sugar residue derived from hexose, pentose or tetrose such as a glucosyl, arabinosyl, xylosyl, or riboayl group; or wherein $R_1$ is an aminoalkyl group A – Z, wherein A is a linear or branched-chain alkylene linkage containing from 1 to 4 carbon atoms and Z represents an amino, lower monoalkylamino, lower dialkylamino, morpholino, N-pyrrelidino, N-piperidino, N-piperazino, N'-lower alkyl-N-piperazino, N'-(ω-hydroxy-lower alkyl)-N-piperazino or N'-(ω-hydroxyalkoxy-lower alkyl)-N-piperazino radical.

$R_2$ represents hydrogen, a linear or branched-chain alkyl group containing from 1 to 20, preferably from 1 to 4, carbon atoms, the trifluoromethyl, hydroxymethyl or carboxy group; a carboxyalkyl group containing 1 to 4 carbon atoms; a dialkylaminoethylaminocarbonylalkyl, dialkylaminoethylaminocarbonyl or dialkylaminoethoxycarbonylalkyl group containing 1 to 4 carbon atoms in the alkyl groups; the dihydroxy propionate radical, methyl diacetoxy propionate, diacetoxy propionic acid dialkylaminoethylamide containing from 1 to 4 carbon atoms in each alkyl group; tetraphydroxy valerate; a polyhydroxyalkyl group containing from 4 to 6 carbon atoms; the cyclopentyl or cyclohexyl group, an alkylcyclohexyl group containing from 1 to 4 carbon atoms per alkyl group, the carboxycyclohexyl group; a 2-, 3- or 4-piperidyl group; a phenyl or alkylphenyl group containing from 1 to 4 carbon atoms per alkyl group; fluorophenyl; tetrahydrofuryl; benzyl; an acylamidophenyl group wherein the acyl group is derived from an aliphatic monocarboxylic acid containing from 1 to 3 carbon atoms; the 4,5,6,7-tetrahydrobenzimidazolyl-(2)-dihydroxyethyl or 4,5,6,7-tetrahydrobenzimidazolyl-(2)-1,2,3,4-tetrahydroxybutyl group; an imidazolylalkyl, triazolylalkyl or tetrazolylalkyl group containing 1 to 4 carbon atoms per alkyl group.

$R_3$ can be hydrogen; a linear or branched-chain alkyl group containing from 1 to 18 carbon atoms, preferably 1 to 2 carbon atoms; a carboxy group or an alkoxycarbonyl group containing 1 to 4 carbon atoms in the alkoxy group.

$R_4$ can be hydrogen or a straight or branched-chain alkyl group containing from 1 to 4, preferably 1 to 2 carbon atoms.

To obtain the products (I), a benzimidazole compound of formula (II), infra, is reacted by contacting it with molecular hydrogen according to the process of this invention:

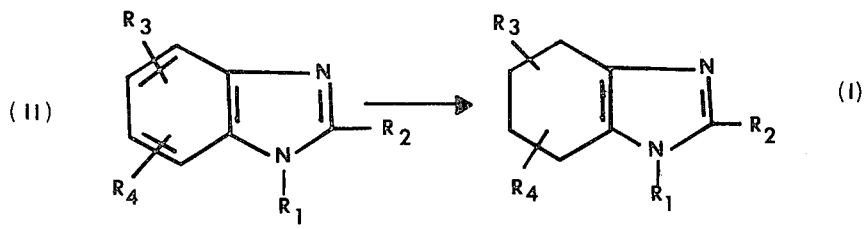

wherein $R_1$, $R_2$, $R_3$, and $R_4$ are defined as above or represent unsaturated precursor groups which, upon being subjected to the hydrogenation process of this invention, are transformed to the $R_1$, $R_2$, $R_3$, and $R_4$ groups as defined above. While some of the starting materials (II) used in this invention are known, others are not. The preparation of the latter is illustrated in Examples 1 to 6 infra, which follow Table IV.

The instant process results in hydrogenation of the benzene nucleus of the benzimidazole compound with essentially no substitution effects. Moreover, other aromatic radicals which may optionally be present are not attacked or only with difficulty under the normal reaction conditions of the instant process. At higher reaction temperatures and pressures, the desired tetrahydrobenzimidazoles are generally first produced, whereafter the hydrogenation can be stopped after the calculated quantity of hydrogen has been taken up. If the hydrogenation is allowed to continue, the said other aromatic radicals may also be hydrogenated. Thus, for example, if 2-phenylbenzimidazole is hydrogenated in accordance with the process of the invention at 80°C. and at a pressure of 1 kg/cm² only 2-phenyl-4,5,6,7-tetrahydrobenzimidazole is obtained. However, if the hydrogenation is carried out at 120°C. and at a pressure of 50 kg/cm², 2-cyclohexyl-4,5,6,7-tetrahydrobenzimidazole is obtained. If it is attempted to hydrogenate 2-pyridyl-benzimidazole by the process of this invention, the pyridine ring is first saturated and thereafter the benzene ring is saturated. The process of the invention can be carried out in a relatively broad range of temperatures at normal pressure or elevated pressure but the preferred temperature range at normal pressure is from about 0°C. up to the boiling point of the solvent or diluent used and frequently it is desirable to operate between 20°C. and 120°C., e.g. at about 80°C., at a hydrogen pressure of from 1 to 120 kg/cm², preferably from 1 to 80 kg/cm². The hydrogenation can also be carried out at pressures higher than 120 kg/cm² or temperatures higher than 120°C., if the compounds to be hydrogenated and the hydrogenation products permit or require this. However, as pointed out above, when working under elevated pressure, aromatic substituents which optionally may be present may also be hydrogenated. In addition, some substituted benzimidazole compounds can undergo changes at elevated reaction temperatures. For instance, the hydrogenation temperature when hydrogenating benzimidazolyl-(2)-acetic acid must not be above about 80°C., since a decarboxylation occurs at higher temperatures and then 2-methyl-4,5,6,7-tetrahydrobenzimidazole is obtained.

The palladium-containing catalysts used in the process of the present invention may be palladium per se or palladium in combined forms such as Pd(OH), Pd(OH)₂, PdCl₂ and PdO and may be used on various supports or carriers as well as by themselves. The preferred catalysts are palladium catalysts on carriers, such as silica, diatomaceous earth, aluminum oxide, pumice, asbestos, carbon, titanium dioxide, barium sulfate, vermiculite and silica gel. The preferred carriers are active carbon, barium sulfate, titanium dioxide, aluminum oxide and silica gel. The palladium/carrier catalysts normally contain palladium in amounts from about 2 to about 10 per cent by weight. The palladium catalysts used in the invention are present in sufficient quantity to provide catalytically significant amounts of palladium. For instance, amounts of from about one gram to about 50 grams of palladium per mole of benzimidazole starting material may be used although more usually from about 5 to about 25 grams of palladium will be found sufficient and, under preferred reaction conditions, amounts of from 10 to 20 grams of palladium per mole of benzimidazole have been found to give excellent results. The efficacy of various forms of palladium catalysts in the process of this invention is illustrated in Table I, infra. It will also be noted from Table I that platinum did not catalyze the reaction (Experiments 1 to 3) and that catalysts containing equal amounts of platinum and palladium were not effective (Experiment 4). Palladium must be present in amounts greater than platinum to provide catalytic effects (Experiments 5 and 6). It will also be noted from Table I that certain forms in which palladium is provided are preferred to others. For instance, when palladium on barium sulfate is used in the hydrogenation of benzimidazole, the reaction goes to completion in one-tenth of the time required when using the same quantity of palladium metal in the form of palladium oxide. The catalysts used in this invention can be reused several times if they are thoroughly washed after each use for example with water, methanol, or glacial acetic acid.

The process of this invention is conveniently carried out in a solvent or diluent wherein the benzimidazole employed is at least partially soluble. Examples for suitable solvents are water, acetic acid, propionic acid and the lower carboxylic acids, lower aliphatic alkanols, glycol ethers, diethyl ether, tetrahydrofurane, or mixtures thereof. If the benzimidazole starting material (II) is used in its free base form, at least an equivalent amount of acid must be supplied for the reaction to proceed. Accordingly, if a non-acidic solvent such as water or methanol is employed, an acid, such as acetic acid, hydrochloric acid, sulfuric acid, perchloric acid and the like must be added to neutralize the basic nitrogen group of the starting material and, preferably, to provide an excess of acid. It has been found that excellent yields in relatively short reaction times are obtained when the reaction is carried out in glacial or dilute acetic acid or water, with the addition of a strong acid (e.g. HCl, $H_2SO_4$, or $HClO_4$) in amounts at least equivalent to the amount of basic starting materials. It will be noted from Table II, infra, that the presence of an equivalent amount of acid is essential for complete reaction and that an excess of added acid accelerates the reaction. In Table III, infra, the performance of various acid/solvent systems is set forth and it can again be seen that an excess of a strong acid is preferred, even when a relatively weak acid, e.g. acetic acid, is used as the solvent.

The experiments set forth in the following Tables I to IV illustrate the practice of the process of this invention. In each experiment, the starting benzimidazole was dissolved in the indicated solvent and was hydrogenated, with stirring, at the temperature stated over the indicated catalyst by bubbling hydrogen from a hydrogen generator into the reaction vessel (flask or, at higher pressures, autoclave) at the indicated pressure. In Table IV, 1 part of benzimidazole starting material was hydrogenated with 0.1 to 1 part of a palladium/support catalyst containing 5 per cent by weight of palladium in 10 to 20 parts of the indicated solvent. After the calculated quantity of hydrogen was absorbed, the catalyst was filtered off and the filtrate concentrated. As tetrahydrobenzimidazole salts are first formed in the process of this invention, various recovery techniques are utilized to obtain the tetrahydrobenzimidazole compounds per se. For those tetrahydrobenzimidazole compounds which do not form salts with bases, the concentrated filtrate was dissolved in water, made alkaline with, e.g., sodium hydroxide, and the hydrogenation product was filtered off or extracted with a suitable solvent (e.g. chloroform, trichloroethylene, benzene, or other water-immiscible solvents). The crude product, if solid, can be recrystallized from a suitable solvent (hereinafter referred to as Recovery Method A) or, if liquid, can be dried over suitable desiccants, the solvent distilled off and the liquid product distilled under high vacuum (hereinafter referred to as Recovery Method B). For those tetrahydrobenzimidazole compounds which do form salts with bases, the concentrated reaction product filtrate is diluted with water and an amount of alkali equivalent to the amount of acid present during hydrogenation is added, followed by cooling and filtering off the precipitated hydrogenation product (Recovery Method C); alternatively, after the addition of the alkali equivalent the solution is evaporated to dryness and the residue is extracted with methanol or acetone, the extract is concentrated and, if the hydrogenation product does not crystallize, it is precipitated with ether or another suitable solvent (Recovery Method D).

The following Tables I to IV set forth the reaction conditions and the results of these experiments. In each instance, the identity of the product was confirmed by its infra-red spectrum. The aromatic vibrations of the benzene ring which are characteristic for the non-hydrogenated benzimidazoles and which are between 670 and 900 $cm^{-1}$, depending on the type of substitution, are not present in the hydrogenated compounds. The $v(HN)$ $_{assoc.}$ absorption between 2400 and 3500 $cm^{-1}$ which is characteristic for the imidazole ring is maintained. With a few exceptions, thin-layer chromatograms of the hydrogenated compounds show general regularities. The more strongly basic hydrogenation products run more slowly on kieselgel H (made by Merck & Co.) using as the eluent benzene/methanol 7:3 or chloroform/methanol 8:2. The spots are made visible in the iodine chamber. Their $R_f$-values are smaller than those of the non-hydrogenated initial compounds.

TABLE I

Hydrogenation of 1.2 grams of benzimidazole in 20 milliliters of glacial acetic acid at normal pressure. The catalysts used contain 5% of metal

| Experiment | Metal, grams | Catalyst in the form of | Temp., °C. | Hydrogenation 50% of the calculated $H_2$ quantity absorbed | Time, Hours 100% of the calculated $H_2$ quantity absorbed |
|---|---|---|---|---|---|
| 1 | 0.2 | $PtO_2$ | 80 | | no hydrogenation |
| | | | 20 | | no hydrogenation |
| 2 | 0.2 | $Pt/BaSO_4$ | 80 | | no hydrogenation |
| 3 | 0.2 | Pt/Carbon | 80 | | no hydrogenation |
| 4 | 0.1 | 1:1 $Pt/Pd/BaSO_4$ | 80 | | no hydrogenation |
| 5 | 0.1 | 1:9 $Pt/Pd/BaSO_4$ | 80 | 19 | not determined |
| 6 | 0.1 | 0.2:9.8 $Pt/Pd/BaSO_4$ | 80 | 13 | not determined |
| 7 | 0.1 | $Pd/BaSO_4$ | 20 | 19 | 40.0 |
| 8 | 0.1 | $Pd/BaSO_4$ | 80 | 8 | 18 |
| 9 | 0.1 | $Pd(OH)_2/BaSO_4$ | 80 | 9.5 | 21.0 |
| 10 | 0.1 | Pd/Carbon | 80 | 10 | 22 |
| 11 | 0.1 | $Pd(OH)_2$/Carbon | 80 | 10.5 | 22.8 |
| 12 | 0.1 | $Pd/Al_2O_3$ | 80 | 11 | 23 |
| 13 | 0.1 | $Pd(OH)_2/Al_2O_3$ | 80 | 11 | 23 |
| 14 | 0.1 | $Pd/SiO_2$ | 80 | 10 | 24 |
| 15 | 0.1 | $Pd(OH)/SiO_2$ | 80 | 10 | 23.5 |
| 16 | 0.2 | $PdCl_2$ | 80 | 38 | not determined |
| 17 | 0.2 | Pd O | 80 | 45 | not determined |

TABLE II

Hydrogenation of 1.2 grams of benzimidazole in 20 milliliters of water with 2 grams of $Pd/BaSO_4$ (5% Pd) at 80°C. and 1 kg/cm²

| Equivalent HCl | Hydrogenation time until the absorption of 50% of the calculated hydrogen quantity (hours) |
|---|---|
| 0.0 | no hydrogenation |
| 0.3 | no hydrogenation |
| 0.6 | 10% of the theoretical of $H_2$ are quickly absorbed, then the hydrogenation comes to a stop |
| 1.0 | 12 |
| 2.0 | 8 |

TABLE III

Hydrogenation of benzimidazole with Pd/BaSO$_4$ (containing 5 per cent by weight of Pd) in 30 milliliters of solvent at normal pressure or in 100 milliliters of solvent at 50 kg/cm$^2$

| Experiment | Benzimidazole grams | Pd Metal grams | Solvent | Added Acid | Temp., °C. | Pressure kg/cm$^2$ | Hydrogenation Time, Hours 50% of the calculated H$_2$ quantity absorbed | 100% of the calculated H$_2$ quantity absorbed |
|---|---|---|---|---|---|---|---|---|
| 1 | 1.2 | 0.1 | water | — | 80 | 1 | no hydrogenation | |
| 2 | 1.2 | 0.1 | water | 0.7 grams CH$_3$COOH | 80 | 1 | 35 | — |
| 3 | 1.2 | 0.1 | 25% acetic acid | — | 80 | 1 | 22 | — |
| 4 | 1.2 | 0.1 | 50% acetic acid | — | 80 | 1 | 13 | — |
| 5 | 1.2 | 0.1 | 99.9% acetic acid | — | 80 | 1 | 8 | 18 |
| 6 | 1.2 | 0.1 | 50% propionic acid | — | 80 | 1 | 15 | — |
| 7 | 1.2 | 0.1 | methanol | — | 20 | 1 | no hydrogenation | |
| 8 | 1.2 | 0.1 | methanol | 0.36 grams ECl | 20 | 1 | 25 | — |
| 9 | 1.2 | 0.1 | water | 0.36 grams HCl | 80 | 1 | 12 | — |
| 10 | 1.2 | 0.1 | water | 0.5 grams H$_2$SO$_4$ | 80 | 1 | 10 | 21 |
| 11 | 1.2 | 0.1 | water | 1.1 grams HClO$_4$ | 80 | 1 | 8 | 17 |
| 12 | 1.2 | 0.1 | 99.9% acetic acid | 0.5 grams H$_2$SO$_4$ | 80 | 1 | 3 | 6.5 |
| 13 | 1.2 | 0.1 | 99.9% acetic acid | 1.1 grams HClO$_4$ | 80 | 1 | 0.9 | 2.1 |
| 14 | 5.7 | 0.1 | 100 milliliters acetic acid | — | 120 | 50 | 0.6 | 1.4 |
| 15 | 5.7 | 0.1 | 50 milliliters acetic acid | 50 milliliters 1N H$_2$SO$_4$ | 120 | 50 | 0.45 | 1.2 |
| 16 | 5.7 | 0.1 | 100 milliliters acetic acid | 5.5 grams HClO$_4$ | 120 | 50 | 0.25 | 0.6 |
| 17 | 5.7 | 0.1 | 90 milliliters methanol | 11 milliliters 5N HCl | 120 | 50 | 1.1 | 2.5 |
| 18 | 5.7 | 0.1 | 100 milliliters water | 5.5 grams HClO$_4$ | 120 | 50 | 1.1 | 2.4 |
| 19 | 5.7 | 0.1 | 100 milliliters propanol | 5.5 grams HClO$_4$ | 120 | 50 | 2.4 | — |
| 20 | 5.7 | 0.1 | dioxane | 5.5 grams HClO$_4$ | 120 | 50 | 3.1 | — |

TABLE IV

| | Starting Material: Formula II where | | | | | Hydrogenation Conditions | | |
|---|---|---|---|---|---|---|---|---|
| | $R_1$ = | $R_2$ = | $R_3$ = | $R_4$ = | Recovery Method | Catalyst | Acid Solvent System | Temp. °C. Pressure kg/cm$^2$ |
| 1 | H | H | H | H | A | Pd/Carbon | AcOH* + HClO$_4$ | 120/50 |
| 2 | (C$_2$H$_5$)$_2$N—C$_2$H$_4$ | H | H | H | B | Pd/BaSO$_4$ | 60% AcOH + HCl | 80/1 |
| 3 | H | CH$_3$ | H | H | A | Pd(OH)$_2$/BaSO$_4$ | 60% AcOH H$_2$SO$_4$ | 120/70 |
| 4 | (C$_2$H$_5$)$_2$N—C$_2$H$_4$ | CH$_3$ | H | H | B | Pd/BaSO$_4$ | AcOH + HCl | 100/60 |
| 5 | H | CH$_3$ | 6—CH$_3$ | N | A | Pd/SiO$_2$ | AcOH + HCl | 120/60 |
| 6 | H | C$_2$H$_5$ | H | H | A | Pd/Al$_2$O$_3$ | 50% AcOH + H$_2$SO$_4$ | 80/1 |
| 7 | H | C$_{17}$H$_{34}$ | H | H | A | Pd/BaSO$_4$ | AcOH + HClO$_4$ | 120/60 |
| 8 | H | H | 5—CH$_3$ | H | A | Pd/BaSO$_4$ | 1n HCl | 80/1 |
| 9 | H | CF$_3$ | H | H | A | Pd/BaSO$_4$ | AcOH + HClO$_4$ | 80/1 |
| 10 | H | — | H | H | A | Pd/SiO$_2$ | 50% AcOH + HCl | 80/1 |
| 11 | H | — | H | H | A | Pd/SiO$_2$ | 50% AcOH | 120/60 |
| 12 | (C$_2$H$_5$)$_2$NC$_2$H$_4$ | —CH$_2$— | H | H | B | Pd/BaSO$_4$ | 60% AcOH + HCl | 80/1 |
| 13 | H | —CH$_2$— | H | H | A | " | 60% AcOH + HCl | 80/1 |
| 14 | H | —CH$_2$— | H | H | A | " | 50% AcOH + H$_2$SO$_4$ | 120/60 |
| 15 | H | CH$_3$CONH——  | H | H | A | " | AcOH | 120/60 |
| 16 | H | (CH$_3$)$_3$C—— | H | H | A | " | AcOH + H$_2$SO$_4$ | 80/1 |
| 17 | H | (CH$_3$)$_3$C—— | H | H | A | " | 50% AcOH | 120/60 |

TABLE IV-continued

| | Starting Material: Formula II where | | | | Hydrogenation Conditions | | | Temp. °C. Pressure kg/cm² |
|---|---|---|---|---|---|---|---|---|
| | $R_1 =$ | $R_2 =$ | $R_3 =$ | $R_4 =$ | Recovery Method | Catalyst | Acid Solvent System | |
| | | | | | | | + $H_2SO_4$ | |
| 18 | H | $H_3C$—⌬— | H | H | A | " | 2n $H_2SO_4$ | 80/1 |
| 19 | H | $H_3C$—⌬— | H | H | A | " | 2N $H_2SO_4$ | 120/60 |
| 20 | H | ⌬— (H₃C ortho) | H | H | A | " | AcOH + $H_2SO_4$ | 80/1 |
| 21 | H | ⌬— (H₃C ortho) | H | H | A | " | AcOH + $H_2SO_4$ | 120/60 |
| 22 | H | ⌬— (COOH) | H | H | C | " | AcOH + HCl | 120/60 |
| 23 | H | —COOH | H | H | C | " | 1n HCl | 60/1 |
| 24 | H | —CONHC$_2$H$_4$N—(C$_2$H$_5$)$_2$ | H | H | A | " | 50% AcOH + HCl | 60/60 |
| 25 | H | H | 5—COOH | H | D | " | 50%AcOH + HCl | 120/60 |
| 26 | H | H | 5—COOCH$_3$ | H | A | " | AcOH + $H_2SO_4$ | 80/60 |
| 27 | H | —CH$_2$COOH | H | H | D | " | 50% AcOH + HCl | 50/1 |
| 28 | H | —CH$_2$CONHC$_2$H$_4$N—(C$_2$H$_5$)$_2$ | H | H | A | " | AcOH + $H_2SO_4$ | 50/70 |
| 29 | H | —(CH$_2$)$_2$—COOH | H | H | D | " | 1n HCl | 120/60 |
| 30 | H | —(CH$_2$)$_2$CONHC$_2$—H$_4$N(C$_2$H$_5$)$_2$ | H | H | A | " | 50% AcOH + HCl | 80/1 |
| 31 | H | —(CH$_2$)$_2$CO$_2$C$_2$H$_4$N—(C$_2$H$_5$)$_2$ | H | H | A | " | AcOH + HCl | 80/60 |
| 32 | H | —CH$_2$OH | H | H | A | Pd(OH)$_2$/carbon | AcOH + $H_2SO_4$ | 80/1 |
| 33 | H | —(CHOH)$_2$COOH | H | H | D | Pd/BaSO$_4$ | 50% AcOH + $H_2SO_4$ | 120/60 |
| 34 | H | —(CHOAc)$_2$—CONHC$_2$H$_4$N—(C$_2$H$_5$)$_2$ | H | H | A | " | AcOH + HCl | 120/60 |
| 35 | H | —(CHOAc)$_2$—COOCH$_3$ | H | H | A | " | AcOH + HCl | 120/60 |
| 36 | H | —(CHOH)$_4$—COOH | H | H | C | " | 1n $H_2SO_4$ | 120/60 |
| 37 | H | benzimidazolyl—CH(OH)—CH(OH)—H | H | H | A | " | AcOH + HCl | 120/60 |
| 38 | H | benzimidazolyl—(CHOH)$_4$—H | H | H | A | " | AcOH + HCl | 120/60 |
| 39 | H | pyridyl | H | H | A | " | water + $H_2SO_4$ | 120/60 |
| 40 | H | pyridyl | H | H | A | " | " | 120/60 |
| 41 | H | F—⌬— | H | H | A | " | 50% AcOH + HCl | 80/1 |
| 42 | H | H | 5—CH$_3$ | 6—CH$_3$ | A | " | 50% AcOH + $H_2SO_4$ | 120/60 |
| 43 | H | CH$_3$ | 4—CH$_3$ | 6—CH$_3$ | A | " | " | 120/60 |
| 44 | H | CH$_3$ | 5—CH$_3$ | H | A | " | " | 120/60 |
| 45 | CH$_3$ | CH$_3$ | H | H | A | " | " | 120/60 |
| 46 | H | C$_2$H$_5$ | 5—CH$_3$ | H | A | Bd/BaSO$_4$ | 50% AcOH + $H_2SO_4$ | 120/60 |
| 47 | H | n—C$_3$H$_7$ | H | H | A | " | " | 120/60 |
| 48 | H | n—C$_3$H$_7$ | 5—CH$_3$ | H | A | " | " | 120/60 |
| 49 | H | iso—C$_3$H$_7$ | H | H | A | " | " | 120/60 |

TABLE IV – Continued

Hydrogenation Product

| | End Product | No. | Yield % | m.p. °C. |
|---|---|---|---|---|
| 1 | 4,5,6,7-tetrahydrobenzimidazole | 1 | 90 | 150 |
| 2 | 1-Diethylaminoethyl-4,5,6,7-tetrahydrobenzimidazole | 2 | 78 | liquid |
| 3 | 2-Methyl-4,5,6,7-tetrahydrobenzimidazole | 3 | 80 | 224 |
| 4 | 1-Diethylaminoethyl-2-methyl-4,5,6,7-tetrahydrobenzimidazole | 4 | 69 | liquid |
| 5 | 2,6-Dimethyl-4,5,6,7-tetrahydrobenzimidazole | 5 | 78 | 185 |
| 6 | 2-Ethyl-4,5,6,7,-tetrahydrobenzimidazole | 6 | 87 | 200 |
| 7 | 2-Heptadecyl-4,5,6,7-tetrahydrobenzimidazole | 7 | 72 | 66 |
| 8 | 5-Methyl-4,5,6,7-tetrahydrobenzimidazole | 8 | 80 | 116 |
| 9 | 2-Trifluoromethyl-4,5,6,7-tetrahydrobenzimidazole | 9 | 85 | 248 |
| 10 | 2-Phenyl-4,5,6,7-tetrahydrobenzimidazole | 10 | 65 | 294 |
| 11 | 2-Cyclohexyl-4,5,6,7-tetrahydrobenzimidazole | 11 | 82 | 266 |
| 12 | 1-Diethylaminoethyl-2-benzyl-4,5,6,7-tetrahydrobenzimidazole | 12 | 75 | liquid |
| 13 | 1-Benzyl-4,5,6,7-tetrahydrobenzimidazole | 13 | 60 | 226 |
| 14 | 2-Cyclohexylmethyl-4,5,6,7-tetrahydrobenzimidazole | 14 | 88 | 267 |
| 15 | 2-(4-Acetylaminophenyl)-4,5,6,7-tetrahydrobenzimidazole | 15 | 70 | 324 |
| 16 | 2-(4-Tert.-butylphenyl)-4,5,6,7-tetrahydrobenzimidazole | 16 | 68 | 276 |
| 17 | 2-(4-Tert.-butylcyclohexyl)-4,5,6,7-tetrahydrobenzimidazole | 17 | 82 | 273 |
| 18 | 2-(4-Tolyl-)4,5,6,7-tetrahydrobenzimidazole | 18 | 70 | 276 |
| 19 | 2-(4-Methylcyclohexyl)-4,5,6,7-tetrahydrobenzimidazole | 19 | 72 | 220 |
| 20 | 2-(2-Tolyl)-4,5,6,7-tetrahydrobenzimidazole | 20 | 80 | 211 |
| 21 | 2-(2-Methylcyclohexyl)-4,5,6,7-tetrahydrobenzimidazole | 21 | 91 | 257 |
| 22 | 2-(2-Carboxycyclohexyl)-4,5,6,7-tetrahydrobenzimidazole | 22 | 80 | 248 |
| 23 | 2-Carboxy-4,5,6,7-tetrahydrobenzimidazole | 23 | 80 | 218 |
| 24 | 2-(Diethylaminoethylaminocarbonyl)4,5,6,7-tetrahydrobenzimidazole | 24 | 70 | 104 |
| 25 | 5-Carboxy-4,5,6,7-tetrahydrobenzimidazole | 25 | 72 | 240 |
| 26 | 5-Methoxycarbonyl-4,5,6,7-tetrahydrobenzimidazole | 26 | 75 | 137 |
| 27 | 2-Carboxymethyl-4,5,6,7-tetrahydrobenzimidazole | 27 | 80 | 154 |
| 28 | 2-Diethylaminoethylaminocarboxymethyl-4,5,6,7-tetrahydrobenzimidazole | 28 | 74 | 146 |
| 29 | 2-Carboxyethyl-4,5,6,7-tetrahydrobenzimidazole | 29 | 84 | 240 |
| 30 | 2-(Diethylaminoethylamino-carbonylethyl)-4,5,6,7-tetrahydrobenzimidazole | 30 | 72 | 171 |
| 31 | 2-(Diethylaminoethoxycarbonylethyl)-4,5,6,7-tetrahydrobenzimidazole HCl | 31 | 61 | 216 |
| 32 | 2-Hydroxymethyl-4,5,6,7-tetrahydrobenzimidazole | 32 | 75 | 206 |

TABLE IV – Continued

Hydrogenation Product

| | End Product | No. | Yield % | m.p. °C. |
|---|---|---|---|---|
| 33 | 3-[4,5,6,7-tetrahydro-benzimidazolyl-(2)]-2,3-dihydroxypropionic acid × H₂O | 33 | 76 | 219 |
| 34 | 3-[4,5,6,7-tetrahydro-benzimidazolyl-(2)]-2,3-diazetoxy-propionic acid diethylaminoethylamide | 34 | 80 | 130 |
| 35 | 3-[4,5,6,7-tetrahydro-benzimidazolyl-(2)]-2,3-diacetoxypropionic acid methylester | 35 | 85 | 149 |
| 36 | 5-[4,5,6,7-tetrahydro-benzimidazolyl-(2)]-2,3,4,5-tetrahydroxy-valerianic acid | 36 | 75 | 220 |
| 37 | 1,2-Bis-[4,5,6,7-tetra-hydrobenzimidazolyl-(2)]-1,2-dihydroxyethane | 37 | 80 | 218 |
| 38 | 1,4-Bis-[4,5,6,7-tetra-hydrobenzimidazolyl-(2)] 1,2,3,4-tetrahydroxy-butane | 38 | 82 | 226 |
| 39 | 2-[4-Piperidine)-4,5,6,7-tetrahydrobenzimidazole | 39 | 72 | 244 |
| 40 | 2-(3-Piperidine)-4,5,6,7-tetrahydrobenzimidazole | 40 | 75 | 195 |
| 41 | 2-(p-Fluorophenyl)-4,5,6,7-tetrahydrobenzimidazole | 41 | 80 | 216 |
| 42 | 5,6-Dimethyl-4,5,6,7-tetrahydrobenzimidazole | 42 | 80 | 143 |
| 43 | 2,4,6-Trimethyl-4,5,6,7-tetrahydrobenzimidazole | 43 | 73 | 201 |
| 44 | 2,5-Dimethyl-4,5,6,7-tetrahydrobenzimidazole | 44 | 80 | 184 |
| 45 | 1,2-Dimethyl-4,5,6,7-tetrahydrobenzimidazole | 45 | 75 | 42 hygroscopic |
| 46 | 2-Ethyl-5-methyl-4,5,6,7-tetrahydrobenzimidazole | 46 | 80 | 204 |
| 47 | 2-n-Propyl-4,5,6,7-tetrahydrobenzimidazole | 47 | 81 | 185 |
| 48 | 2-n-Propyl-5-methyl-4,5,6,7-tetrahydrobenzimidazole | 48 | 85 | 185 |
| 49 | 2-Isopropyl-4,5,6,7-tetrahydrobenzimidazole | 49 | 85 | 240 |

*AcOH is acetic acid; Ac is the acetate group

The preparation of certain of the novel starting materials employed in the instant process is illustrated by the following Examples 1 to 6:

Example 1

Preparation of 5-(6)-carbomethoxybenzimidazole 2 grams of 5-(6)-carboxybenzimidazole are boiled under reflux for 1 hour in 10 milliliters of thionyl chloride. The excess thionyl chloride is distilled off and the residue dissolved in methanol. After evaporation of the methanol, the residue is treated with dilute ammonia and taken up in chloroform. The product is precipitated with benzine in quantitative yield; m.p. 134°–136°C.

Example 2

Preparation of benzimidazolyl-2-acetic acid diethylaminoethylamide 19 grams of benzimidazolyl-2 -methyl acetate and 12 grams of diethylaminoethylamine are heated for 30 minutes at 80°–90°C. After cooling, ether is added to the reaction mixture and the precipitated product is filtered off. After re-crystallization from a mixture of benzene and benzine, 16.2 grams of product are obtained; m.p. 119°–121°C.

Example 3

Preparation of 3-benzimidazolyl-2-propionic acid diethylaminoethylamide 3.8 grams of benzimidazolyl propionic acid are dissolved in 10 milliliters of thionyl chloride while stirring. After the reaction has ended, the excess thionyl chloride is evaporated, dry benzene and benzine are added to the residue which is filtered to yield 3.7 grams of acid chloride of the m.p. 100°–103°C. (with decomposition). This acid chloride is introduced, with stirring, into a solution of 4.6 grams of diethylaminoethylamine in 10 milliliters of acetone, the reaction mixture is stirred for 10 minutes and evaporated to dryness. The residue is dissolved in water, made alkaline with sodium hydroxide and extracted with ethyl acetate. After re-crystallization from a mixture of ethyl acetate and benzine, 4.8 grams of product are obtained; m.p. 261°–263°C.

Example 4

Preparation of 3-benzimidazolyl-2-propionic acid diethylaminoethyl ester 2 grams of benzimidazolyl-propionic acid are transformed, by boiling for a short time in acetic acid anhydride, into the corresponding cyclic amide. The resulting compound (0.7 grams) and 1.0 grams of diethylaminoethanol are heated for 15 minutes at 120°C. the melt is dissolved in ethyl acetate and the solution washed 3 times with water. After drying over sodium sulfate, the solvent is distilled off and the semi-solid residue product can be used without further purification in the hydrogenation process.

Example 5

Preparation of 3-benzimidazolyl-(2)-2,3-diacetoxypropionic acid diethylaminoethylamide 3-benzimidazolyl-(2)-2,3-dihydroxy-propionic acid is transformed by boiling in acetic acid anhydride into the cyclic amide. 3 grams of the resulting compound are boiled in 30 milliliters of benzene and 1.3 grams of diethylaminoethylamine for 1 hour under reflux, concentrated and the product precipitated with benzine to yield reaction product at 80% of the theoretical; m.p. 140°C.

Example 6

Preparation of methyl-3-benzimidazolyl-(2)-2,3-diacetoxy-propionate

The cyclic amide obtained as intermediate product in Example 5 is dissolved in methanol and heated for 1 ½ hours in a tube at 130°C. After evaporating the methanol, the residue is re-crystallized from a mixture of benzene and benzine to yield the product at 75% of the theoretical; m.p. 104°C.

Certain of the products obtained by the practice of the process of this invention are novel compounds and have utility in a number of technical areas. These new compounds, generally, respond to the following general formula:

wherein $R_1$, $R_2$, $R_3$ and $R_4$ are as defined above with the proviso that if $R_2$ is hydrogen or alkyl, then at least one of $R_1$, $R_3$ and $R_4$ must be other than hydrogen or alkyl, As illustrative of the novel compounds provided by this invention, there can be mentioned those compounds listed as products (in Table IV) which fall under Formula Ia, supra.

In addition to providing the novel 4,5,6,7-tetrahydrobenzimidazole compounds defined by Formula Ia, supra, this invention is directed to salts, including quaternary ammonium salts, of said compounds. These salts are derived from inorganic or organic acids, such as hydrogen halides, sulfuric acid, nitric acid, perchloric acid, acetic acid, propionic acid, oxalic acid, maleic acid, succinic acid, alkyl-and alkenylsuccinic acids, aliphatic, cycloaliphatic and aromatic sulfonic acids, such as petroleum sulfonic acids, mahogany sulfonic acids, p-toluene sulfonic acid and p-dodecylbenzene sulfonic acid; and picric acid.

The quaternary ammonium salts are derived from conventional alkylating agents, such as alkyl, cycloalkyl or arylalkyl halides, e.g. methyl bromide and ethyl iodide or dialkyl sulfates. For instance, for tetrahydrobenzimidazoles of the general formula (Ia) wherein $R_1$ is other than hydrogen, one mole of the tetrahydro compound is dissolved in methanol, and one mole of an alkyl, cycloalkyl or arylalkyl halide is added to the solution. The reaction is carried out either for a relatively long period at room temperature or for a shorter period with heating. The solvent is removed by distillation and the quaternary ammonium salt remains in substantially pure form. For tetrahydrobenzimidazoles of the general formula (Ia) wherein $R_1$ is hydrogen, 1 mole of the tetrahydro compound is reacted with 1 mole of an alkyl, cycloalkyl or arylalkyl halide and the 1.1 mole of sodium hydroxide is added to the reaction mixture and the mixture is refluxed for 1 hour. After further addition of 1 mole of an alkyl, cycloalkyl or arylalkyl halide, the mixture is refluxed for 1 hour, the precipitated sodium salt is filtered off and the solvent is distilled off. The quaternary ammonium salt remains as residue. The latter reaction ($R_1$ = H) proceeds according to the following schematic reaction equation (Hal. = Halogen):

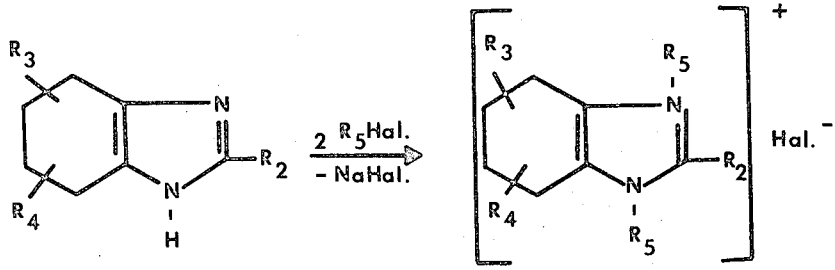

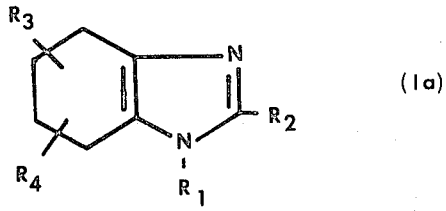

(Ia)

and with the further proviso that if $R_2$ is phenyl or cyclohexyl, then at least one of $R_1$, $R_3$ and $R_4$ must be other than hydrogen. In the definitions of $R_1$, $R_2$, $R_3$ and $R_4$ as used throughout this specification, the expressions "lower alkyl","lower alkylene", "lower alkylamino", "dialkylamino" or "alkylenediamine" group refer to groups containing from ml to 8 carbon atoms per alkyl group unless otherwise stated.

The tetrahydrobenzimidazole compounds which can be produced by the process of the invention can be used for many different purposes, e.g. as corrosion inhibitors, especially for copper and copper alloys, acid-passivation agents for iron and steel, inhibitors for metal pickling baths, antioxidants in mineral oils, lubricating oils, fuel oils and rubber, as chemical intermediates for the production of pharmaceuticals, dyestuffs, e.g. azo dyes, agricultural chemicals, dyeing auxiliaries, polymerization catalysts for isocyanate addition reactions and as curing agents for epoxy resins. The quaternary ammonium salts of the tetrahydrobenzimidazoles exhibit distinct properties as surface-active agents and may be used for wetting and softening of textiles. 2-Methyl-tetrahydrobensimidazole shows diuretic activity when tested on rabbits and dogs.

The following examples illustrate the use of some 4,5,6,7-tetrahydrobenzimidazoles as antioxidants in rubber, as metal-deactivators in lubricating oils and as iron corrosion inhibitors.

Protection of Rubber Against Oxidation

Master batches of the following composition were prepared and vulcanized for 20 minutes at 153°C. in a press.

| a) | Test mixture | parts |
|---|---|---|
| | natural rubber (pale crepe) | 100 |
| | zinc oxide | 10 |
| | stearic acid | 1 |
| | barium sulfate | 75 |
| | $TiO_2$ (anatase) | 10 |
| | sulfur | 3 |
| | diphenyl guanidine (accelerator) | 0.5 | b) mixture as in a) plus 2 parts of the deacylated compound No. 15 of Table IV, i.e. 2-(4-aminophenyl)-4,5,6,7-tetrahydrobenzimidazole, c) mixture as in a) plus 2 parts of the compound No. 16 in Table IV, i.e. 2-(4-tert.-butylphenyl)-4,5,6,7-tetrahydrobenzimidazole, d) mixture as in a) plus 2 parts of the compound No. 17 of the Table IV, i.e. 2-(4-tert.-butylcyclohexyl)-4,5,6,7-tetrahydrobenzimidazole.

After the vulcanization and aging, the vulcanisate has the following properties:

| Properties before aging | (a) (Control) | (b) | (c) | (d) |
|---|---|---|---|---|
| Hardness (Sh A) | 47 | 49 | 50 | 55 |
| Elasticity, % | 62 | 65 | 65 | 70 |
| 100% Modulus, kp/cm$^2$ | 10 | 11 | 12 | 17 |
| 300% Modulus, kp/cm$^2$ | 22 | 22 | 28 | 52 |
| Tensile strength at break, kp/cm$^2$ | 190 | 197 | 208 | 195 |
| Elongation at break, % | 750 | 730 | 690 | 600 |
| Properties after aging; 48 hours at 100°C. in hot air | | | | |
| Hardness (Sh A) | 44 | 46 | 46 | 48 |
| Elasticity, % | 50 | 53 | 53 | 55 |
| 100% Modulus, kp/cm$^2$ | 7 | 10 | 9 | 10 |
| 300% Modulus, kp/cm$^2$ | 17 | 23 | 20 | 32 |
| Tensile strength at break, kp/cm$^2$ | 36 | 60 | 70 | 82 |
| Elongation at break, % | 430 | 530 | 600 | 545 |
| Remaining tensile strength, % | 19 | 30 | 34 | 42 |
| Remaining elongation at break, % | 57 | 73 | 87 | 91 |
| Improvement over control for tensile strength, % | — | 58 | 79 | 121 |
| elongation at break, % | — | 28 | 53 | 60 |

The properties of the vulcanisates were determined according to the following German Industrial Standards (DIN): Tensile strength, modulus and elongation at break DIN 53 504, Testbar S 2.
Elasticity: DIN 53 512
Hardness: DIN 53 505

Metal Deactivation in Lubricating Oils

According to ASTM D-130 a copper strip is dipped into a corrosive, mineral oil SAE 10 containing sulfurized sperm oil adjusted to a total sulfur content of 0.7%. The lubricating oil is heated to an elevated temperature and contains 0.05% of the test compound.

The degree darkening of the copper strip is a measure for the passivating action of the compound.

| Compound No. of Table IV | Cu-Activity at 100°C. after 3 hours | 24 hours | Appearance of the copper strip |
|---|---|---|---|
| Control | 4 a | 4 b | black |
| 1 | 3 a | 3 a | orange yellow |
| 6 | 3 a | 3 a | orange yellow |
| 16 | 3 a | 3 b | bluish green |
| 17 | 3 b | 4 a | bluish black |
| 19 | 3 a | 3 b | bluish green |
| 20 | 3 a | 3 a | orange yellow |

Similar results are obtained in gear oils which contain the salts of alkyl dithiophosphates and sulfurized sperm oil.

Corrosion Inhibition of Iron

The tetrahydrobenzimidazoles in the form of their petroleum sulfonic acid salts are excellent corrosion inhibitors of iron. This is shown by the following test.

Steel plates (DIN 17 200) are brushed with a lubricating oil SAE 20 containing 0.2% of an ethoxylated nonylphenol (a) and 0.8% of a tetrahydrobenzimidazole petrolem sulfonic acid salt. Subsequently they are tested according to DIN 50 017 in a weather-o-meter according to Kesternich; see W. Kesternich "Stahl und Eisen" (Steel and Iron), 1951, No. 11, page 587.

For comparison, a lubricating oil SAE 20 containing 0.2% of the ethoxylated nonylphenol (a) and lubricating oils containing sodium petroleum sulfonate (b) and barium petroleum sulfonate (c) are tested which contained each 0.2% ethoxylated nonylphenol and 0.8% of the tetrahydrobenzimidazole petroleum sulfonic acid salt.

The results are summarized in Table V.

TABLE V

| Test | Lubricating oil Composition | Number of cycles until beginning corrosion | Appearance of the steel plate |
|---|---|---|---|
| 1 | base oil+(a) | 0 | corroded |
| 2 | base oil+(a)+(b) | 3 | some stains |
| 3 | base oil+(a)+(c) | 2 | some stains |
| 4 | base oil+(a)+ compound No. 5 as petroleumsulfonate | >11 | metallic bright |
| 5 | base oil+(a)+ compound No. 6 as petroleumsulfonate | >11 | metallic bright |

Tests No. 4 and 5 were discontinued after 11 cycles. No corrosion was observed (one cycle = 24 hours).

What is claimed is:

1. Process for the production of a 4,5,6,7-tetrahydrobenzimidazole compound which process comprises hydrogenating the corresponding benzimidazole compound in the presence of a strong mineral acid in an amount at least equivalent to the amount of basic benzimidazole compound and in the contacting presence of a catalytically significant amount of a palladium-containing catalyst selected from the group consisting of palladium metal, palladium oxide, palladium dichloride, palladium mono- and di-hydroxide, and palladium/platinum mixtures wherein said mixtures contain more palladium than platinum.

2. Process as claimed in claim 1 wherein the palladium-containing catalyst is supported on a carrier.

3. Process as claimed in claim 2 wherein the carrier is carbon, barium sulfate, titanium dioxide, aluminum oxide, or silica.

4. Process as claimed in claim 1 wherein the hydrogenation is carried out at a temperature of from 20° to 120°C. and at a hydrogen pressure of from 1 to about 120 kg/cm².

5. Process as claimed in claim 1 wherein said corresponding benzimidazole compound is a 1-substituted benzimidazole compound having no substitute on the benzene nucleus.

6. Process as claimed in claim 1 wherein said corresponding benzimidazole compound is a 2-substituted benzimidazole compound.

7. Process as claimed in claim 1 wherein said corresponding benzimidazole compound is a 2-substituted benzimidazole compound having at least one additional substituent in the benzene nucleus of said compound.

8. Process for the production of 4,5,6,7-tetrahydrobenzimidazole which comprises hydrogenating benzimidazole in the presence of a strong mineral acid in an amount at least equivalent to the amount of benzimidazole and in the contacting presence of a catalytically significant amount of a palladium-containing catalyst selected from the group consisting of palladium metal, palladium oxide, palladium dichloride, palladium mono- and di-hydroxide, and palladium/platinum mixtures wherein said mixtures contain more palladium than platinum.

9. Process as claimed in claim 1 wherein said palladium-containing catalyst is used in an amount of from 5 to 25 grams of palladium per mol of the starting benzimidazole.

10. Process as claimed in claim 2 wherein said palladium-containing catalyst is palladium metal.

11. Process as claimed in claim 1 wherein said palladium-containing catalyst is palladium metal supported on activated carbon, barium sulfate, titanium dioxide aluminum oxide or silica.

12. 2-(4-Aminophenyl)-4,5,6,7-tetrahydrobenzimidazole.

* * * * *